United States Patent
Smith et al.

(10) Patent No.: US 8,997,134 B2
(45) Date of Patent: Mar. 31, 2015

(54) CONTROLLING PRESENTATION FLOW BASED ON CONTENT ELEMENT FEEDBACK

(71) Applicant: International Business Machines Corporation, Armonk, NY (US)

(72) Inventors: Andrew B. Smith, Morrisville, NC (US); Eric M. Woods, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 155 days.

(21) Appl. No.: 13/709,124

(22) Filed: Dec. 10, 2012

(65) Prior Publication Data

US 2014/0165087 A1    Jun. 12, 2014

(51) Int. Cl.

| | |
|---|---|
| H04N 7/173 | (2011.01) |
| H04N 21/475 | (2011.01) |
| G06Q 50/00 | (2012.01) |
| H04N 21/414 | (2011.01) |
| H04N 21/8541 | (2011.01) |

(52) U.S. Cl.
CPC ........... H04N 21/4758 (2013.01); G06Q 50/00 (2013.01); *H04N 21/41415* (2013.01); *H04N 21/8541* (2013.01)
USPC .......................................................... 725/24

(58) Field of Classification Search
CPC ................................................ H04N 21/4758
See application file for complete search history.

(56) References Cited

U.S. PATENT DOCUMENTS

| | | |
|---|---|---|
| 7,480,624 B2 | 1/2009 | Roman et al. |
| 2004/0056781 A1 | 3/2004 | Rix et al. |
| 2006/0107195 A1 | 5/2006 | Ramaswamy et al. |
| 2007/0100938 A1 | 5/2007 | Bagley et al. |
| 2007/0192728 A1 | 8/2007 | Finley et al. |
| 2009/0143695 A1 | 6/2009 | Mullen et al. |
| 2010/0198654 A1 | 8/2010 | Kumar et al. |
| 2013/0124649 A1* | 5/2013 | Triantos et al. ............... 709/206 |

OTHER PUBLICATIONS

"Dynamic Presentation Modification Based on Real-Time Comments" Technical Disclosure. IP.COM Prior Art Database, IP.COM No. IP.COM000212436D. [online] <http://priorartdatabase.com/IPCOM/000212436>.

* cited by examiner

*Primary Examiner* — Gigi L Dubasky
(74) *Attorney, Agent, or Firm* — David J. Zwick; Ryan Lewis

(57) ABSTRACT

Embodiments of the present invention disclose a method, computer program product, and system for selecting presentation content. Presentation content is displayed to an audience, the presentation content includes a plurality of content elements. One or more feedback inputs are received from the audience, each feedback input is associated with one of the content elements. A computer determines an alternative presentation content based on the received feedback inputs, and the alternative presentation content is displayed.

12 Claims, 7 Drawing Sheets

US 8,997,134 B2

CONTROLLING PRESENTATION FLOW BASED ON CONTENT ELEMENT FEEDBACK

FIELD OF THE INVENTION

The present invention relates generally to the field of content presentation, and more particularly to control of content presentation based on audience feedback.

BACKGROUND OF THE INVENTION

An important aspect of the art of the presentation is to keep the presentation relevant. This is typically accomplished by adjusting the content and flow of a presentation to tailor it to the target audience. In order to tailor the presentation, information is gathered from the audience, typically post-presentation, usually in the form of solicited feedback from a survey or request for comments. Systems also exist to receive audience feedback during a presentation, such as a simple "raise your hand" response to a question from the presenter, or more sophisticated systems, such as electronic instant "polling" devices given to audience members. Useful information may also be obtained from observing the audience during a presentation, for example, for behavioral signs indicating level of interest, and from ad hoc audience communications, such as audience questions during the presentations and audience comments to the presenter after the presentation. In response to the gathered information, future presentations can be adjusted to better address the perceived audience interest in various aspects of the presentation. If the presenter is adept, adjustments to the presentation can be made on-the-fly, for example, by verbally expounding on certain perceived areas of audience interest, or "fast-forwarding" through portions of the presentation perceived to be of low audience interest.

SUMMARY

Embodiments of the present invention disclose a method, computer program product, and system for selecting presentation content. Presentation content is displayed to an audience, the presentation content includes a plurality of content elements. One or more feedback inputs are received from the audience, each feedback input is associated with one of the content elements. A computer determines an alternative presentation content based on the received feedback inputs, and the alternative presentation content is displayed.

DETAILED DESCRIPTION

Figure 1:
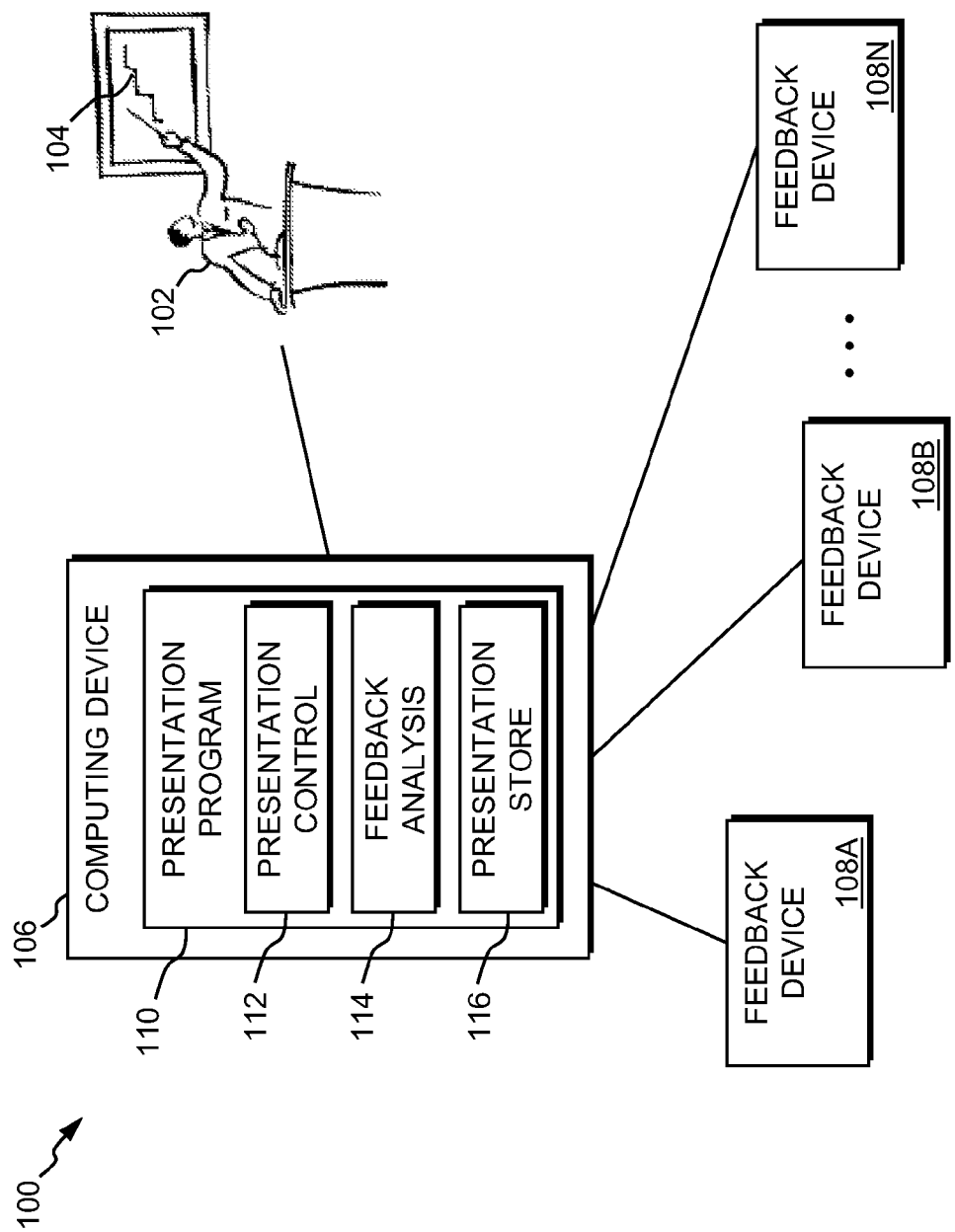
FIG. 1 is a functional block diagram illustrating a presentation control system, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Embodiments of the present invention generally describe a presentation control system in which audience members provide feedback during a presentation to a presentation program on a computing device via audience feedback devices. The feedback is on a content element level, which includes presentation elements, such as a slide bullets, and control elements, such as slide-level feedback buttons, and can include, for example, an indication that the audience member would like the presenter to go into more depth on a particular point, or to skip over a particular point. If enough specific feedback is received, the presentation program can offer the presenter one or more alternative slide arrangements for the remainder of the presentation. If the presenter chooses one of the alternative presentations, the presentation program will display the new presentation to the audience.

The present invention will now be described in detail with reference to the Figures. FIG. 1 is a functional block diagram illustrating a presentation control system 100, in accordance with an embodiment of the present invention. In a preferred embodiment, presentation control system 100 includes computing device 106, for use by a presenter 102, and feedback devices 108A through 108N, which are connected to computing device 106. In exemplary embodiments, feedback devices 108A through 108N can be directly connected to computing device 106, for example, via wired or wireless connections, or through a local area network (LAN), a wide area network (WAN) such as the Internet, or a combination of the networks, and can include wired, wireless, or fiber optic connections.

Feedback devices 108 represent devices accessible by audience members viewing a presentation, for example, on projection screen 104, that allow the audience members to provide feedback to presentation program 110 (described below). In a preferred embodiment, a feedback device 108 is a computing device that displays a presentation, and allows for user selection of a content element, such as a slide bullet. In a first exemplary embodiment, a feedback device 108 is a PC-style computing device, for example, a netbook, notebook, or laptop computer. In this embodiment, user selection of a content element can be accomplished, for example, by "clicking" or "right-clicking" on the portion of the presentation with a mouse device, or with a keypad device. In a second exemplary embodiment, a feedback device 108 is a tablet-style computing device, for example, the iPad® by Apple, Inc., having a touch screen user interface. In this embodiment, user selection of a content element can be accomplished, for example, by touching the screen at the location that the content element is displayed. In general, feedback devices 108 can be any device capable of allowing an audience member to provide feedback on a content element, in accordance with embodiments of the invention.

In certain embodiments, user selection of a content element causes display of a feedback menu, by which the audience member will register his/her feedback. In other embodiments, the selection of a content element causes feedback to be registered. For example, selection of a content element always indicates that the audience member would like additional presentation material related to the selected content element.

Figure 2:
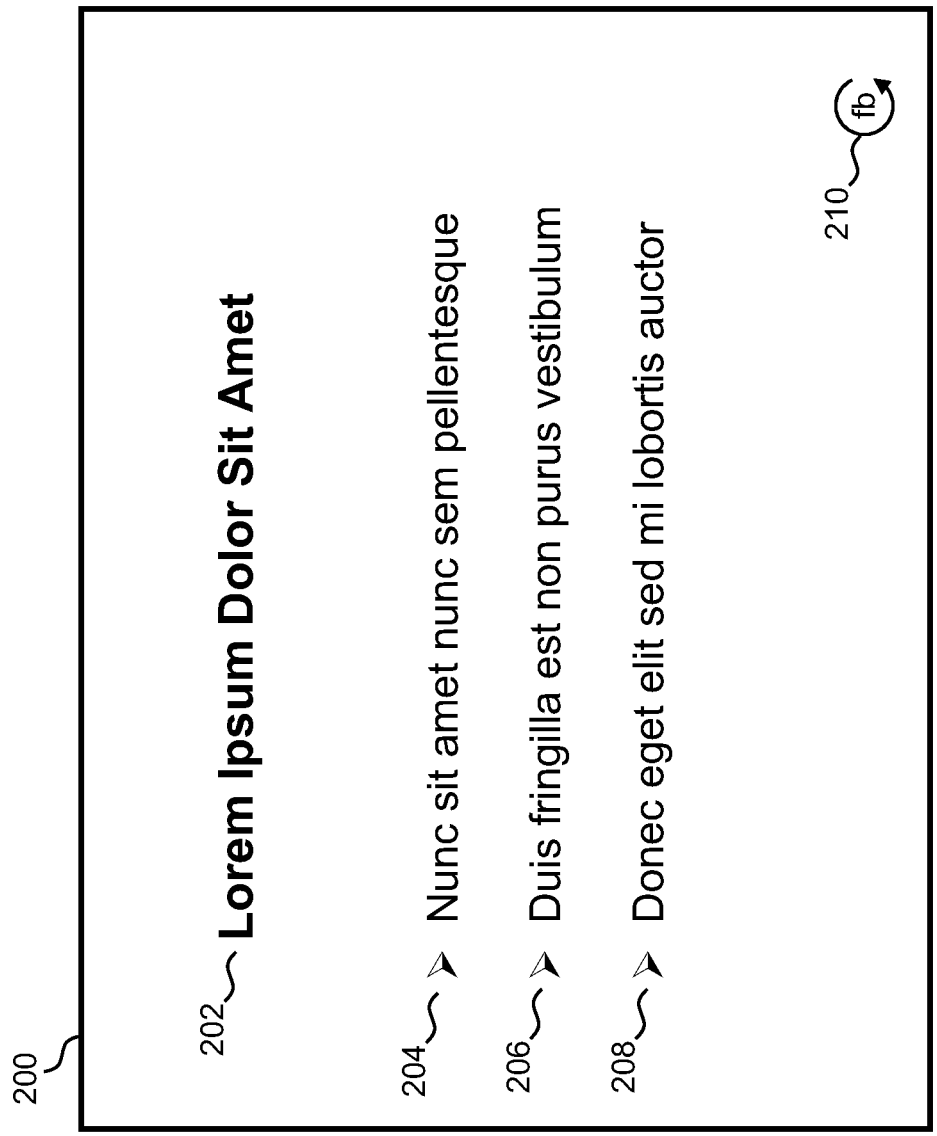
FIG. 2 shows an exemplary presentation slide, in accordance with an embodiment of the present invention.

FIG. 2 shows exemplary presentation content in the form of a presentation slide 200, in accordance with an embodiment of the present invention. Presentation slide 200 includes content elements that include four presentation elements—slide title 202, and slide bullets 204, 206, and 208—and a slide feedback control element 210. In a preferred embodiment, an audience member can provide feedback on each of the presentation elements, and general feedback at the slide or presentation level via the slide feedback control element 210. With regard to the first exemplary embodiment described above, in which a feedback device 108 is a PC-style computing device, each presentation element 202 to 208 and slide feedback control element 210, as displayed on feedback device 108, are defined as "clickable" elements. Many presentation software packages include the ability, when designing presentations, to define action buttons and clickable elements to assist in implementing such PC-based embodiments. An audience member selects one of the presentation elements 202 to 208, or slide feedback control element 210, by "clicking" on the element.

Figure 3:
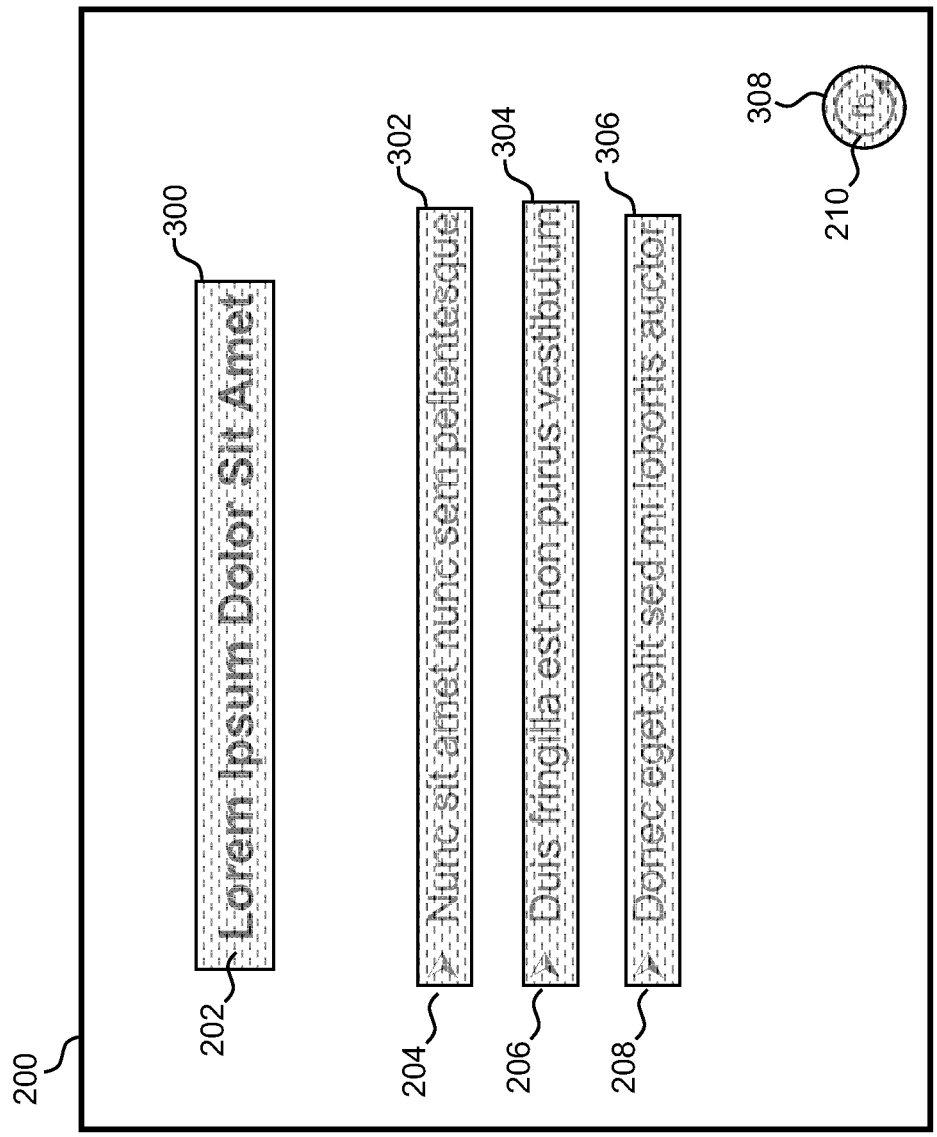
FIG. 3 shows an exemplary presentation slide with content element touch-screen zones, in accordance with an embodiment of the present invention.

FIG. 3 shows exemplary presentation content in the form of a presentation slide 200, with content element touch-screen zones 300 to 308, in accordance with an embodiment of the present invention. This embodiment relates to the second exemplary embodiment described above, in which a feedback device 108 is a tablet-style computing device having a touch screen user interface. Numerous software development kits (SDKs) and application programming interfaces (APIs) are available to application developers to assist in implementing such touch-screen based implementations. Each presentation element 202 to 208 and slide feedback control element 210, as displayed on feedback device 108, has an associated touch-screen zone 300 to 308, respectively, which defines the area which an audience member can touch to select the associated content element. An audience member selects one of the presentation elements 202 to 208 or slide feedback control element 210 by touching on the associated touch-screen zone 300 to 308.

Figure 4:
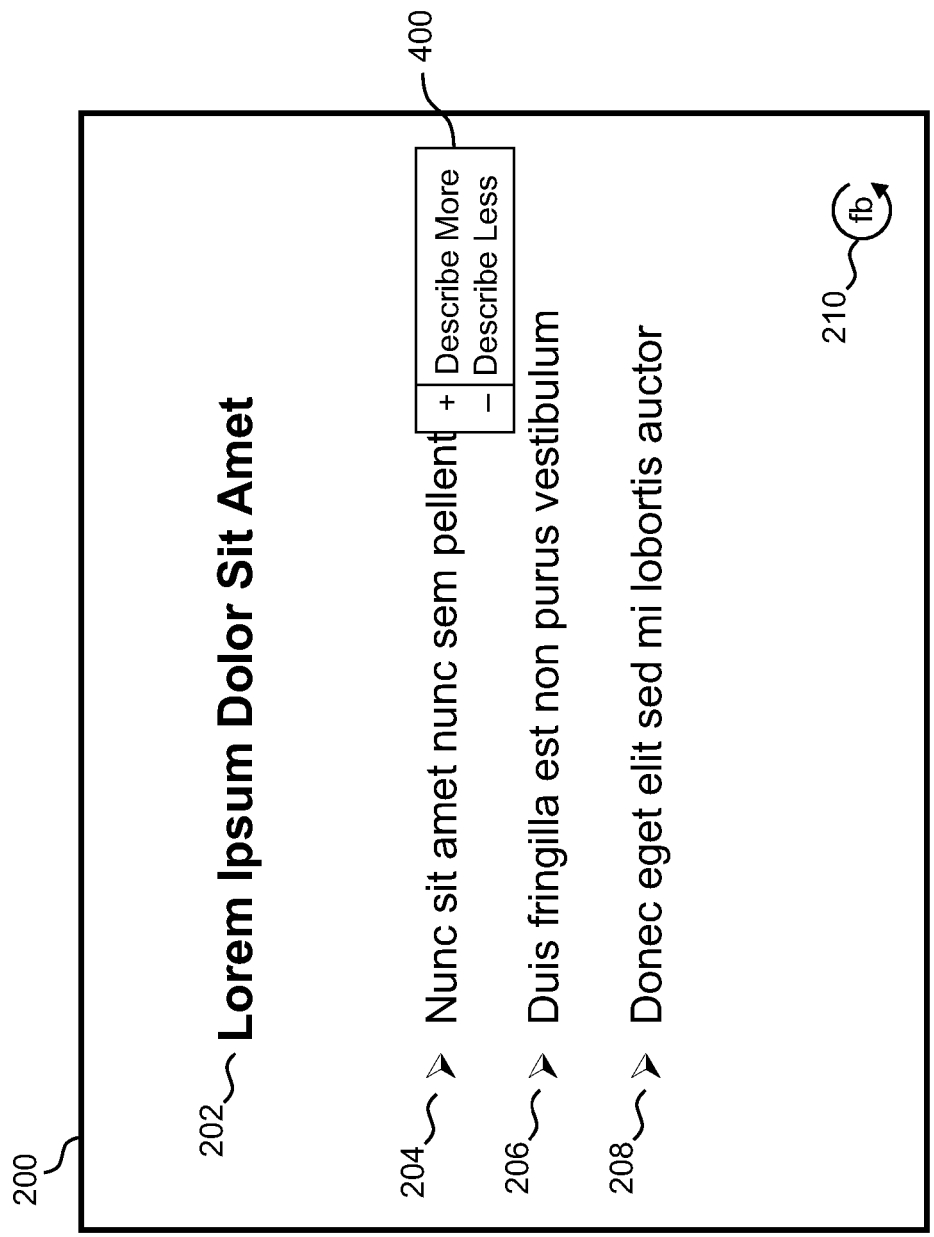
FIG. 4 shows an exemplary presentation slide with a feedback menu, in accordance with an embodiment of the present invention.

FIG. 4 shows an exemplary presentation slide with a feedback menu 400, in accordance with an embodiment of the present invention. In a preferred embodiment, after an audience member has selected a content element, for example, presentation element 204, a feedback menu, such as feedback menu 400, is displayed. The audience member then selects the desired content element feedback choice, which is transmitted to presentation program 110. In this example, feedback menu 400 displays two feedback choices: "describe more", and "describe less". In other implementations, additional, fewer, or different feedback choices can be displayed for user selection. As mentioned above, in certain embodiments, no feedback menu is displayed, and selection of a presentation element always indicates, for example, that the audience member would like additional presentation material related to the selected presentation element. In a preferred embodiment, a slide feedback control element 210 allows for slide or presentation level feedback. For example, selection of slide feedback control element 210 causes a feedback menu to be displayed showing high-level feedback choices related to the presenter, the presentation topic as a whole, the quality of the presentation media, etc. In certain embodiments, feedback can be in the form of natural language input, for example, comments entered by keyboard or keypad input via feedback devices 108.

In various embodiments of the present invention, computing device 106, which is described in more detail below with respect to FIG. 7, can be a laptop computer, tablet computer, netbook computer, personal computer (PC), a desktop computer, or any programmable electronic device capable of communicating with feedback devices 108, and supporting the functionality required of embodiments of the invention.

In a preferred embodiment, computing device 106 includes presentation program 110, which further includes presentation control module 112, feedback analysis module 114, and presentation store 116. Presentation store 116 stores the presentation content of one or more presentations. In an exemplary embodiment, presentation content is one or more slides, for example, slide 200, and a presentation is an arrangement of one or more slides. For example, popular slide-based presentation formats include PowerPoint® by Microsoft Corporation, and Impress, part of the OpenOffice™ software suite by The Apache Software Foundation. In preferred embodiments, one or more slides are associated with a presentation, but are not included in the presentation. For example, the associated slides may contain content that can optionally be included in the presentation. The optional content can be, for example, additional explanatory presentation material, or additional material not included in the presentation. While the exemplary embodiment describes presentation content as slides, other forms of presentation content can be used. For example, the presentation content can include embedded or linked video or video segments, animation, sound files, or slide presentations with highly animated transitions within and between slides. In general, any presentation content may be used that satisfies requirements of embodiments of the invention.

Feedback analysis module 114 operates to receive and process feedback from feedback devices 108. In a preferred embodiment, feedback analysis module 114 identifies, categorizes, and tabulates audience member feedback inputs, and determines if an alternative presentation content is indicated. For example, in response to the display of slide 200 to an audience on projection screen 104, one or more audience members may select slide bullet 204 via their feedback devices 108, and in response to the display of menu 400, select the "Describe More" option. Indications of these feedback menu selection choices are transmitted to feedback analysis module 114. Feedback analysis module 114 then determines, for example, if the number of "Describe More" feedback inputs related to slide bullet 204 are above a threshold value, and if so, determines an alternative presentation content for the remainder of the presentation. As mentioned above, in certain embodiments, feedback can be in the form of natural language input, for example, comments entered by keyboard or keypad input via feedback devices 108. In these embodiments, for example, the feedback analysis module 114 would process the natural language input and appropriately categorize the feedback such that it can be used in the determination of whether and which alternative presentation content is indicated. In general, feedback analysis module 114 can determine whether an alternative presentation content is indicated, and what the alternative presentation content should be, based on logical and arithmetical combinations and comparisons of audience feedback inputs from a current presentation content, such as a slide currently being displayed, feedback inputs from previously displayed presentation content in the current presentation, and feedback inputs from previous presentations of the same content.

Table 1 shows a rule-based example of several alternative presentation contents that may be applied to a presentation by feedback analysis module 114 in response to audience feedback inputs for slide 1 of a presentation, received via feedback devices 108. For example, if audience feedback received by feedback analysis module 114 indicates that the audience wants more description for presentation element 1, indicated in the table as "+E1", optional slides 101, 102, and 103, residing in presentation store 116, can be inserted after slide 2, indicated in the table as "A2". Similarly, if audience feedback indicates that the audience wants less description for presentation element 2, indicated in the table as "−E2", slides 3 and 4 can be removed from the presentation, indicated in the table as "−3, −4".

TABLE 1

Alternative Presentation Content

| Slide # | FB Element # | Presentation Order |
|---|---|---|
| 1 | +E1 | A2, 101, 102, 103 |
| 1 | −E2 | −3, −4 |

Presentation control module 112 operates to cause the display of a presentation, for example, on projection screen 104, and on feedback devices 108. Presentation control module 112 can also operate to change the presentation content of the remainder of a presentation, such as adding or removing slides, and change the order of the presentation content, based on control information provided by feedback analysis module 114. Presentation control module 112 also operates to display to the presenter 102 indications of alternative presentation contents, and a mechanism by which the presenter can select an alternative presentation content.

Figure 5:
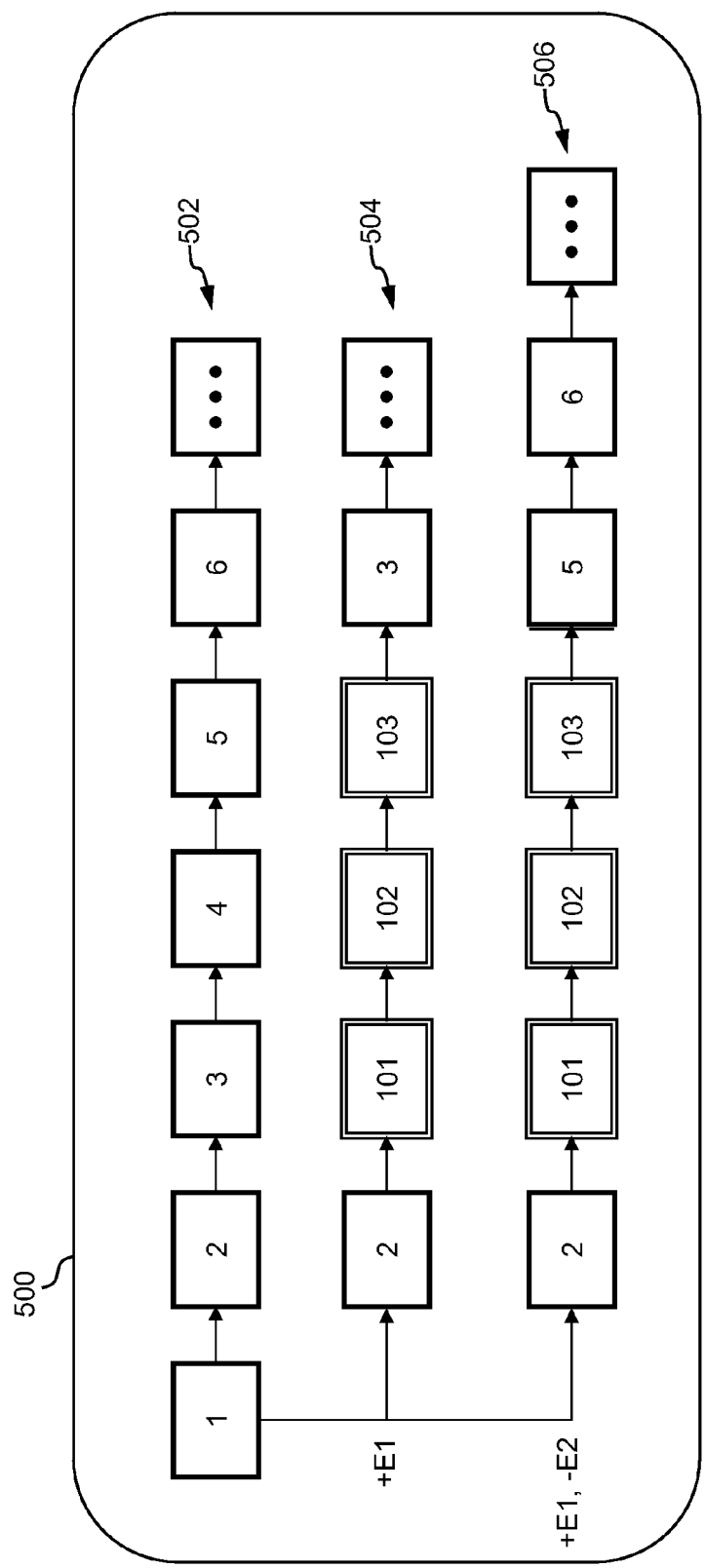
FIG. 5 shows an embodiment of providing alternative presentation selection, in accordance with an embodiment of the present invention.

FIG. 5 shows an embodiment of providing alternative presentation selection, in accordance with an embodiment of the present invention. An alternative presentation selection display area 500 is shown on a display of computing device 106 to presenter 102, showing slide thumbnails. In this example, derived from the example of Table 1, alternative presentation selection display area 500 includes three presentation contents: current presentation content 502, first alternative presentation content 504, and second alternative presentation content 506. Each presentation content refers to a set of slides in a specific order. For example, current presentation content 502 is displayed with thumbnails of slides 1 through 6, with a last slide thumbnail showing ellipses to indicate the remaining slides. In this example, slide 1 is currently being displayed to an audience on projection screen 104 and on feedback devices 108. As the presentation progresses, thumbnails of slides already displayed need not be included in current presentation content 502. Audience feedback via feedback devices 108 has been received by feedback analysis module 114, and it has determined that two alternative presentation contents are indicated—504 and 506, which correspond to the two entries in Table 1. First alternative presentation content 504 corresponds to the first entry in Table 1, and displays slide thumbnails that indicate the addition to the current presentation content 502 of slides 101, 102, and 103 after slide 2, in response to audience feedback indicating a desire for more description related to element 1 on slide 1. Second alternative presentation content 506 corresponds to a combination of the first and second entries in Table 1, and displays slide thumbnails that indicate the addition of slides 101, 102, and 103 after slide 2, and the deletion of slides 3 and 4, in response to audience feedback indicating a desire for more description related to element 1 on slide 1, and less description related to element 2.

With respect to the embodiment of FIG. 5, presenter 102 sees the alternative presentation contents, for example, 502 and 504 on a display of computing device 106, and can select one or the other, or neither, by, for example, the click of a mouse or touching the display screen. As additional audience feedback inputs are received and processed by feedback analysis module 114, typically as the presentation progresses, additional alternative presentation contents relative to the current content being displayed will be determined and displayed to presenter 102 in alternative presentation selection display area 500. The information displayed within alternative presentation selection display area 500 can be in any visual display format or style that allows for presenter 102 to select an alternative presentation content. In preferred embodiments, the format shows the current presentation content and alternative presentation contents, indicating the specific audience feedback that caused the identification of an alternative content, and a visual indication of changes in the alternative presentation content over the current presentation content.

Figure 6:
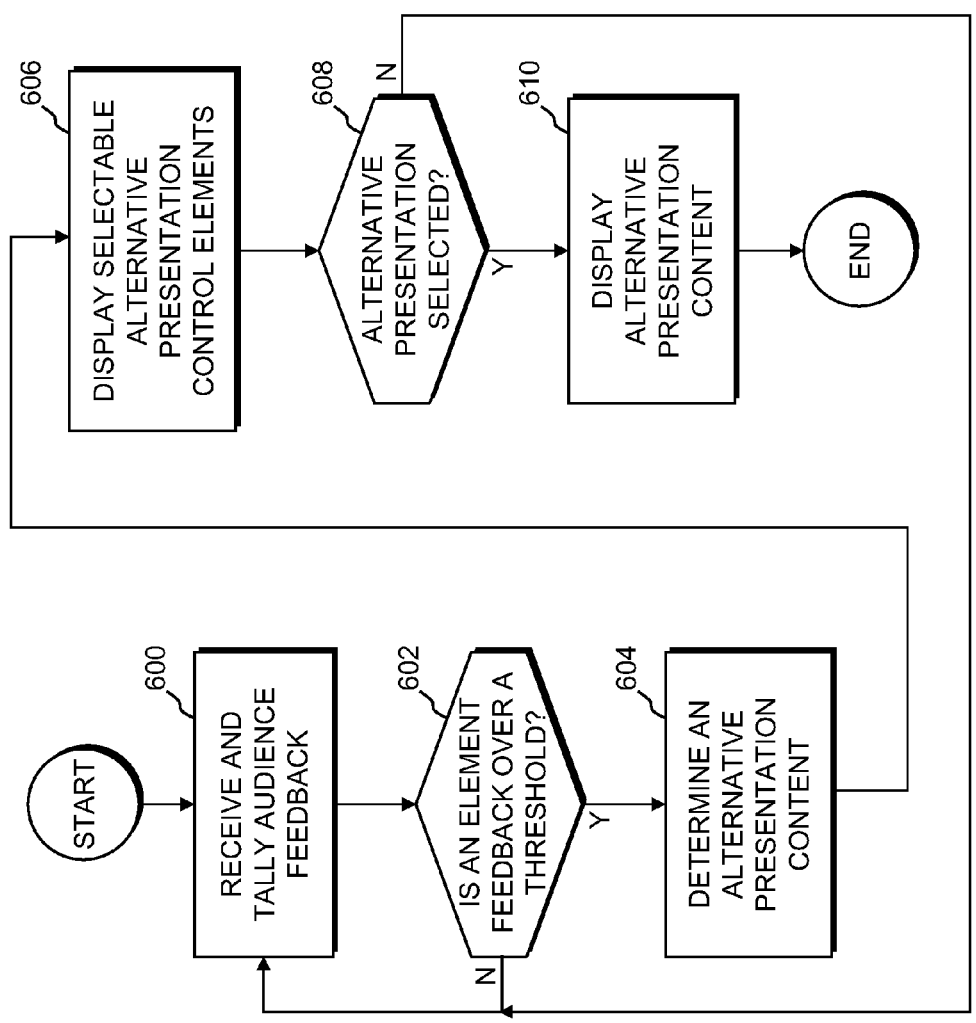
FIG. 6 is a flowchart depicting operational steps of a presentation control program of the presentation control system of FIG. 1, in accordance with an embodiment of the present invention.

FIG. 6 is a flowchart depicting operational steps of presentation control program 110 of presentation control system 100 of FIG. 1, in accordance with an embodiment of the present invention. As the presentation progresses, audience feedback at the presentation element level, as well as at the slide or presentation level, is received by feedback analysis module 114 via audience feedback devices 108. The feedback inputs are tallied on an ongoing basis (step 600).

The feedback inputs are then compared against threshold values to determine if alternative presentation content is indicated (step 602). As mentioned above, feedback analysis module 114 can determine whether an alternative presentation content is indicated, and what the alternative presentation content should be, based on logical and arithmetical combinations and comparisons of audience feedback inputs from a current presentation content, such as a slide currently being displayed, feedback inputs from previous presentation content in the current presentation, and feedback inputs from previous presentations of the same content.

If the feedback inputs for one or more presentation elements or slides are not above a threshold value (decision step 602, "No" branch), then feedback analysis module 114 continues to tally the received feedback inputs (step 600). If the feedback inputs for one or more presentation elements or slides are above a threshold value (decision step 602, "Yes" branch), then an alternative presentation content is determined (step 604). In an exemplary embodiment, the alternative presentation content is determined from a rules-based analysis, which can use, for example, a set of rules such as shown in Table 1.

After alternative presentation contents are determined (step 604), selectable alternative presentation content control elements are displayed on a display of computing device 106 such that presenter 102 may select one of the alternative presentation contents (step 606). If an alternative presentation content is selected (decision step 608, "Yes" branch), then the current presentation is modified to reflect the alternative presentation content, and presentation control module 112 causes the new content to be displayed to the audience on, for example, projection screen 104 (step 610). If an alternative presentation content is not selected (decision step 608, "No" branch), then feedback analysis module 114 continues to tally the received feedback inputs (step 600).

Figure 7:
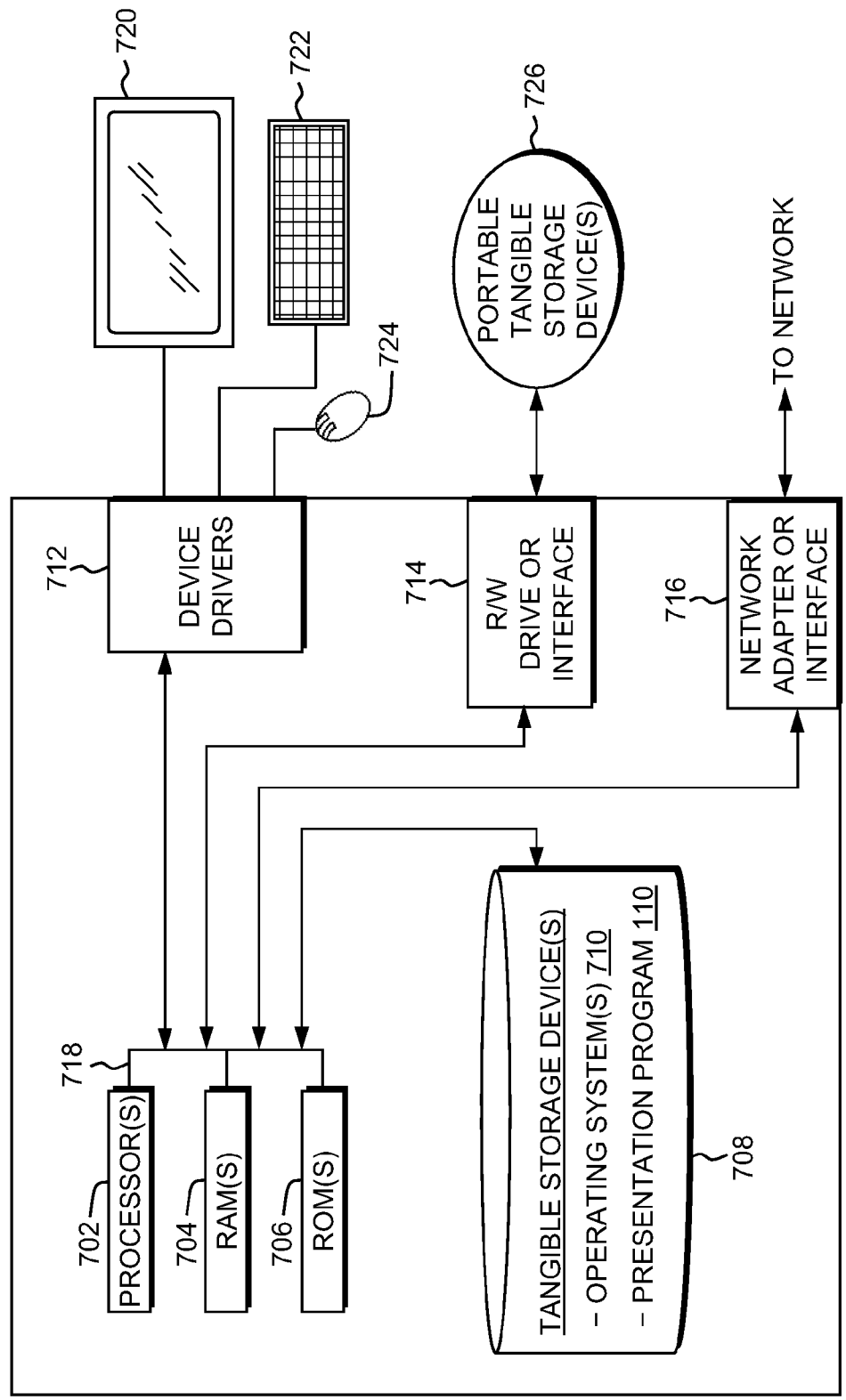
FIG. 7 depicts a block diagram of components of the computing device of the presentation control system of FIG. 1, in accordance with an embodiment of the present invention.

FIG. 7 depicts a block diagram of components of the computing device 106 of presentation control system 100 of FIG. 1, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

Computing device 106 can include one or more processors 702, one or more computer-readable RAMs 704, one or more computer-readable ROMs 706, one or more tangible storage devices 708, device drivers 712, read/write drive or interface 714, network adapter or interface 716, all interconnected over a communications fabric 718. Communications fabric 718 can be implemented with any architecture designed for passing data and/or control information between processors (such as microprocessors, communications and network processors, etc.), system memory, peripheral devices, and any other hardware components within a system.

One or more operating systems 710, and presentation program 110, are stored on one or more of the computer-readable tangible storage devices 708 for execution by one or more of the processors 702 via one or more of the respective RAMs 704 (which typically include cache memory). In the illustrated embodiment, each of the computer-readable tangible storage devices 708 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 106 can also include a R/W drive or interface 714 to read from and write to one or more portable computer-readable tangible storage devices 726. Presentation program 110 on computing device 106 can be stored on one or more of the portable computer-readable tangible storage devices 726, read via the respective R/W drive or interface 714 and loaded into the respective computer-readable tangible storage device 708.

Computing device 106 can also include a network adapter or interface 716, such as a TCP/IP adapter card or wireless communication adapter (such as a 4G wireless communication adapter using OFDMA technology). Presentation program 110 on computing device 106 can be downloaded to the computing device from an external computer or external storage device via a network (for example, the Internet, a local area network or other, wide area network or wireless network) and network adapter or interface 716. From the network adapter or interface 716, the programs are loaded into the computer-readable tangible storage device 708. The network may comprise copper wires, optical fibers, wireless transmission, routers, firewalls, switches, gateway computers and/or edge servers.

Computing device 106 can also include a display screen 720, a keyboard or keypad 722, and a computer mouse or touchpad 724. Device drivers 712 interface to display screen 720 for imaging, to keyboard or keypad 722, to computer mouse or touchpad 724, and/or to display screen 720 for pressure sensing of alphanumeric character entry and user selections. The device drivers 712, R/W drive or interface 714 and network adapter or interface 716 can comprise hardware and software (stored in computer-readable tangible storage device 708 and/or ROM 706).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method and program product have been disclosed for a presentation control system. However, numerous modifications and substitutions can be made without deviating from the scope of the present invention. Therefore, the present invention has been disclosed by way of example and not limitation.

What is claimed is:

1. A computer-implemented method for selecting presentation slides, the method comprising:
displaying, by a computer, a slide presentation to an audience, wherein the slide presentation comprises displaying, one after another, a subset of presentation slides selected from a predefined set of presentation slides, each presentation slide including a plurality of content elements and a pair of selectable control elements associated with each content element, one of the pair of selectable control elements selectable to transmit feedback to the computer indicating a request for the display of more presentation content related to the associated content element, and the other of the pair of selectable control elements selectable to transmit feedback to the computer indicating a request for the display of less presentation content related to the associated content element;
receiving, by the computer, one or more feedback inputs from the audience during the slide presentation, wherein each feedback input is associated with the selection of one or the other of the pair of selectable control elements associated with a content element;
in response to determining, by the computer, based on the one or more received feedback inputs, to display more presentation content related to the associated content element, modifying, by the computer, a portion of the subset of presentation slides not yet displayed to include one or more additional slides from the predefined set of presentation slides that display presentation content related to the associated content element;
in response to determining, by the computer, based on the one or more received feedback inputs, to display less presentation content related to the associated content element, modifying, by the computer, a portion of the subset of presentation slides not yet displayed to remove one or more slides from the subset of presentation slides that display presentation content related to the associated content element; and
displaying, by the computer, the modified portion of the subset of presentation slides not yet displayed.

2. A method in accordance with claim 1, wherein determining, based on the received feedback inputs, to display more presentation content related to a content element, and determining, based on the received feedback inputs, to display less presentation content related to a content element, are further based on one or more of:
logical operations performed on processed feedback inputs associated with content elements currently being displayed to the audience; logical operations performed on processed feedback inputs associated with content elements previously displayed to the audience; arithmetical operations performed on processed feedback inputs associated with content elements currently being displayed to the audience; and arithmetical operations performed on processed feedback inputs associated with content elements previously displayed to the audience.

3. A method in accordance with claim 1, wherein the computer receives the one or more feedback inputs via one or more computing devices accessible to the audience.

4. A method in accordance with claim 1, wherein:
the content elements comprise at least one of the following: presentation slides; video or video segments; links to video or video segments; animation; link to animation; embedded sound files; links to sound files; slide presentations with animated transitions within and between slides; and textual or graphical control elements.

5. A computer program product for selecting presentation slides, the computer program product comprising:
one or more computer-readable non-transitory storage media and program instructions stored on the one or more computer-readable non-transitory storage media, the program instructions comprising:
program instructions to display a slide presentation to an audience, wherein the slide presentation comprises displaying, one after another, a subset of presentation slides selected from a predefined set of presentation slides, each presentation slide including a plurality of content elements and a pair of selectable control elements associated with each content element, one of the pair of selectable control elements selectable to indicate a request for the display of more presentation content related to the associated content element, and the other of the pair of selectable control elements selectable to indicate a request for the display of less presentation content related to the associated content element;
program instructions to receive one or more feedback inputs from the audience during the slide presentation, wherein each feedback input is associated with the selection of one or the other of the pair of selectable control elements associated with a content element;
program instructions, in response to determining, based on the one or more received feedback inputs, to display more presentation content related to the associated content element, to modify a portion of the subset of presentation slides not yet displayed to include one or more additional slides from the predefined set of presentation slides that display presentation content related to the associated content element;
program instructions, in response to determining, based on the one or more received feedback inputs, to display less presentation content related to the associated content element, to modify a portion of the subset of presentation slides not yet displayed to remove one or more slides from the subset of presentation slides that display presentation content related to the associated content element; and program instructions to display the modified portion of the subset of presentation slides not yet displayed.

6. A computer program product in accordance with claim 5, wherein the program instructions to determine, based on the received feedback inputs, to display more presentation content related to a content element, and to determine, based on the received feedback inputs, to display less presentation content related to a content element, are further based on one or more of:

logical operations performed on processed feedback inputs associated with content elements currently being displayed to the audience; logical operations performed on processed feedback inputs associated with content elements previously displayed to the audience; arithmetical operations performed on processed feedback inputs associated with content elements currently being displayed to the audience; and arithmetical operations performed on processed feedback inputs associated with content elements previously displayed to the audience.

7. A computer program product in accordance with claim 5, wherein the computer receives the one or more feedback inputs via one or more computing devices accessible to the audience.

8. A computer program product in accordance with claim 5, wherein:

the content elements comprise at least one of the following: presentation slides; video or video segments; links to video or video segments; animation; link to animation; embedded sound files; links to sound files; slide presentations with animated transitions within and between slides; and textual or graphical control elements.

9. A computer system for selecting presentation content, the computer system comprising:

one or more computer processors;

one or more computer-readable storage media; and program instructions stored on one or more of the computer-readable storage media for execution by at least one of the one or more processors, the program instructions comprising:

program instructions to display a slide presentation to an audience, wherein the slide presentation comprises displaying, one after another, a subset of presentation slides selected from a predefined set of presentation slides, each presentation slide including a plurality of content elements and a pair of selectable control elements associated with each content element, one of the pair of selectable control elements selectable to indicate a request for the display of more presentation content related to the associated content element, and the other of the pair of selectable control elements selectable to indicate a request for the display of less presentation content related to the associated content element;

program instructions to receive one or more feedback inputs from the audience during the slide presentation, wherein each feedback input is associated with the selection of one or the other of the pair of selectable control elements associated with a content element;

program instructions, in response to determining, based on the one or more received feedback inputs, to display more presentation content related to the associated content element, to modify a portion of the subset of presentation slides not yet displayed to include one or more additional slides from the predefined set of presentation slides that display presentation content related to the associated content element;

program instructions, in response to determining, based on the one or more received feedback inputs, to display less presentation content related to the associated content element, to modify a portion of the subset of presentation slides not yet displayed to remove one or more slides from the subset of presentation slides that display presentation content related to the associated content element; and program instructions to display the modified portion of the subset of presentation slides not yet displayed.

10. A computer system in accordance with claim 9, wherein the program instructions to determine, based on the received feedback inputs, to display more presentation content related to a content element, and to determine, based on the received feedback inputs, to display less presentation content related to a content element, are further based on one or more of:

logical operations performed on processed feedback inputs associated with content elements currently being displayed to the audience; logical operations performed on processed feedback inputs associated with content elements previously displayed to the audience; arithmetical operations performed on processed feedback inputs associated with content elements currently being displayed to the audience; and arithmetical operations performed on processed feedback inputs associated with content elements previously displayed to the audience.

11. A computer system in accordance with claim 9, wherein the computer receives the one or more feedback inputs via one or more computing devices accessible to the audience.

12. A computer system in accordance with claim 9, wherein:

the content elements comprise at least one of the following: presentation slides; video or video segments; links to video or video segments; animation; link to animation; embedded sound files; links to sound files; slide presentations with animated transitions within and between slides; and textual or graphical control elements.

* * * * *